(12) United States Patent
Wolff

(10) Patent No.: US 6,197,142 B1
(45) Date of Patent: Mar. 6, 2001

(54) COMPOSITE PANEL AND METHOD OF MAKING THE SAME

(76) Inventor: Michael Helmut Wolff, Suite #21, 10340 - 117 Street, Edmonton, Alberta (CA), T5K 1X8

(\*) Notice: Subject to any disclaimer, the term of this patent is extended or adjusted under 35 U.S.C. 154(b) by 0 days.

(21) Appl. No.: 09/291,408

(22) Filed: Apr. 13, 1999

(30) Foreign Application Priority Data

May 4, 1998 (CA) .................................................. 2 236 629

(51) Int. Cl.[7] .............................. B32B 35/00; B32B 3/10
(52) U.S. Cl. ........................... 156/177; 156/179; 264/113
(58) Field of Search .................................... 156/62.2, 177, 156/179, 292; 264/112, 113

(56) References Cited

U.S. PATENT DOCUMENTS

| | | |
|---|---|---|
| 3,083,128 | 3/1963 | Herrington et al. . |
| 3,884,749 \* | 5/1975 | Pankoke ................................ 156/501 |
| 4,061,813 | 12/1977 | Geimer et al. . |
| 4,904,517 | 2/1990 | Lau et al. . |

\* cited by examiner

*Primary Examiner*—Sam Chuan Yao
(74) *Attorney, Agent, or Firm*—Christensen O'Connor Johnson Kindness PLLC

(57) ABSTRACT

A composite panel includes fibres adhered together by means of an adhesive binder to form a sheet having opposed planar faces and fibre reinforcement ribs imbedded in the sheet.

2 Claims, 3 Drawing Sheets

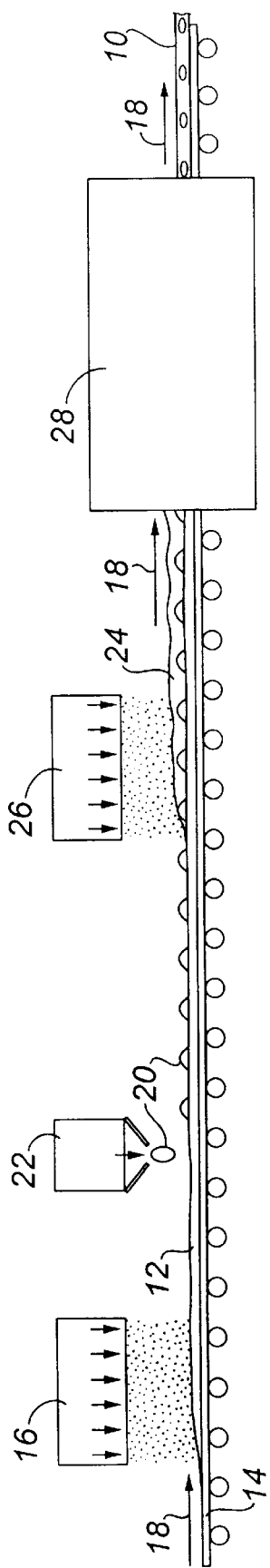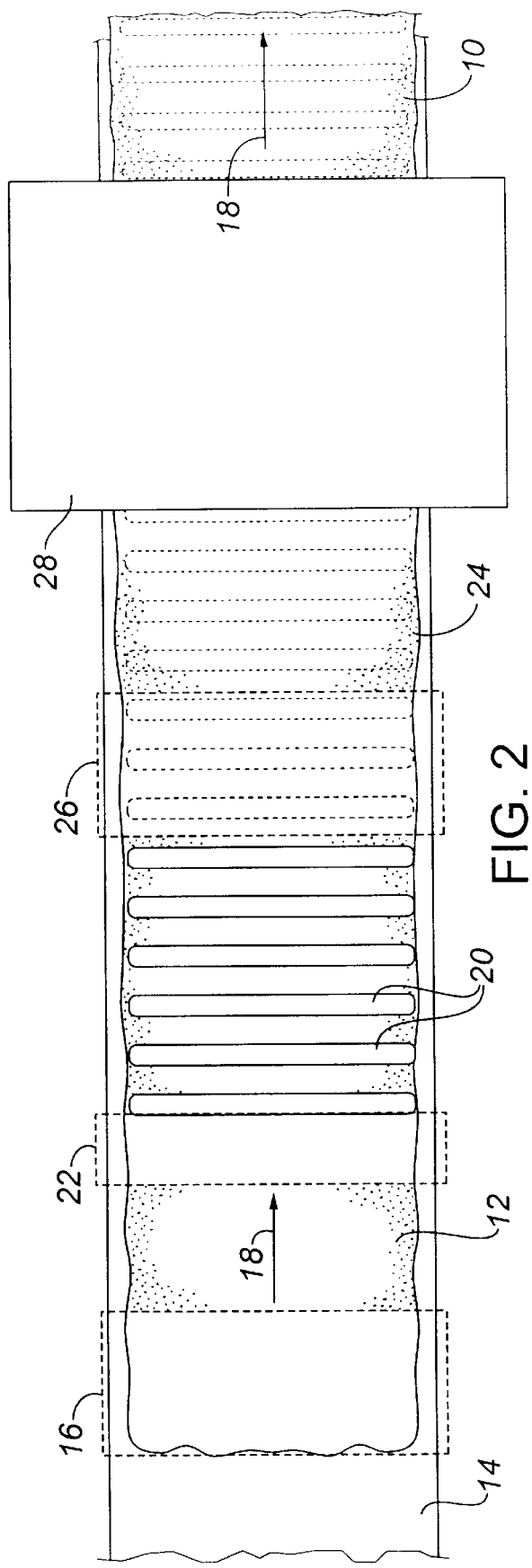

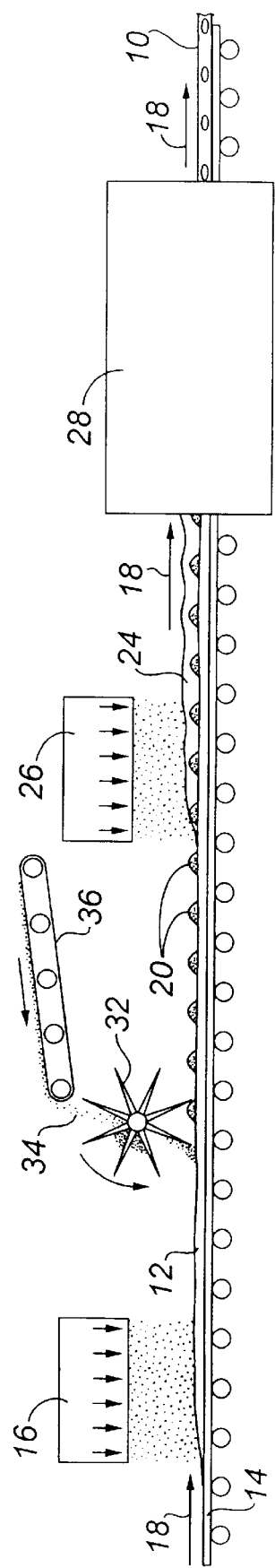
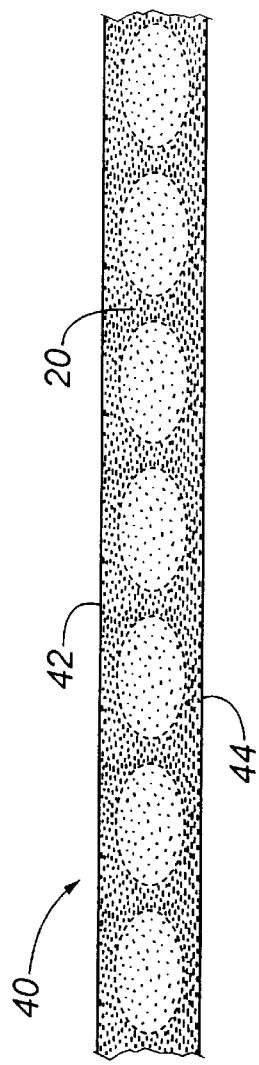
FIG. 3
FIG. 4

COMPOSITE PANEL AND METHOD OF MAKING THE SAME

FIELD OF THE INVENTION

The present invention relates to a composite panel and a method of making the same.

BACKGROUND OF THE INVENTION

While composite panels are typically made out of wood fibre, they can be made out of other materials such as straw. Composite panels made out of wood fibre are known by a variety of names, including: oriented strandboard, wafer board, and chip board. In the past, structural reinforcement of these composite panels has been achieved by selection of the shape of the panel. For example, some success has been obtained through the use of a sinusoidal form, commonly known as "wave board". U.S. Pat. No. 3,083,128 and U.S. Pat. No. 4,904,517 disclose structural reinforcement through a plurality of external reinforcing ribs.

Unfortunately, the same features of shape or configuration that provide composite panels with their structural reinforcement, have inherent disadvantages that have retarded their commercial acceptance. The panels are difficult to manufacture, as special press platens are required to create the special shapes. The special press platens are difficult to adapt to high speed, high volume production runs. Consequently, the composite panels have tended to be expensive. In use, the special shapes make the composite panels difficult to consistently cut to a desired size and, generally, make them more difficult to work with.

SUMMARY OF THE INVENTION

What is required is a structurally reinforced composite panel that derives its structural reinforcement from other than its shape.

According to one aspect of the present invention there is provided a composite panel which includes fibres adhered together by means of an adhesive binder to form a sheet having opposed planar faces. Fibre reinforcement ribs are imbedded in the sheet.

The composite panel constructed in accordance with the teachings of the present invention has planar faces. This enables it to be manufactured with only minor changes to the forming lines of existing plants. The resulting composite panels can be used for virtually any application. The structural reinforcement is embedded in the wood panel in the form of reinforcement ribs. The reinforcement ribs can take a number of forms. For example, the reinforcement ribs can be parallel and spaced at intervals along the sheet or can be serpentine.

According to another aspect of the present invention there is provided a method of making a composite panel. A first step involves laying a continuous layer of fibres mixed with an adhesive binder. A second step involves laying onto the layer of fibres, reinforcement ribs of fibres mixed with an adhesive binder. A third step involves pressing the layer of fibres and the reinforcement ribs together to form a panel with planar opposed faces and reinforcement ribs imbedded in the panel.

BRIEF DESCRIPTION OF THE DRAWINGS

These and other features of the invention will become more apparent from the following description in which reference is made to the appended drawings, wherein:

FIG. 1 is side elevation view of a conveyor along which the steps in the preferred method of making a composite panel occur.

FIG. 2 is a top plan view of the conveyor illustrated in FIG. 1, with parallel spaced reinforcement ribs being formed.

FIG. 3 is a side elevation view of a mechanism for forming the parallel spaced reinforcement ribs illustrated in FIG. 2.

FIG. 4 is a side elevation view, in section, of a composite panel fabricated in accordance with the preferred method.

DETAILED DESCRIPTION OF THE PREFERRED EMBODIMENT

Figure 5:
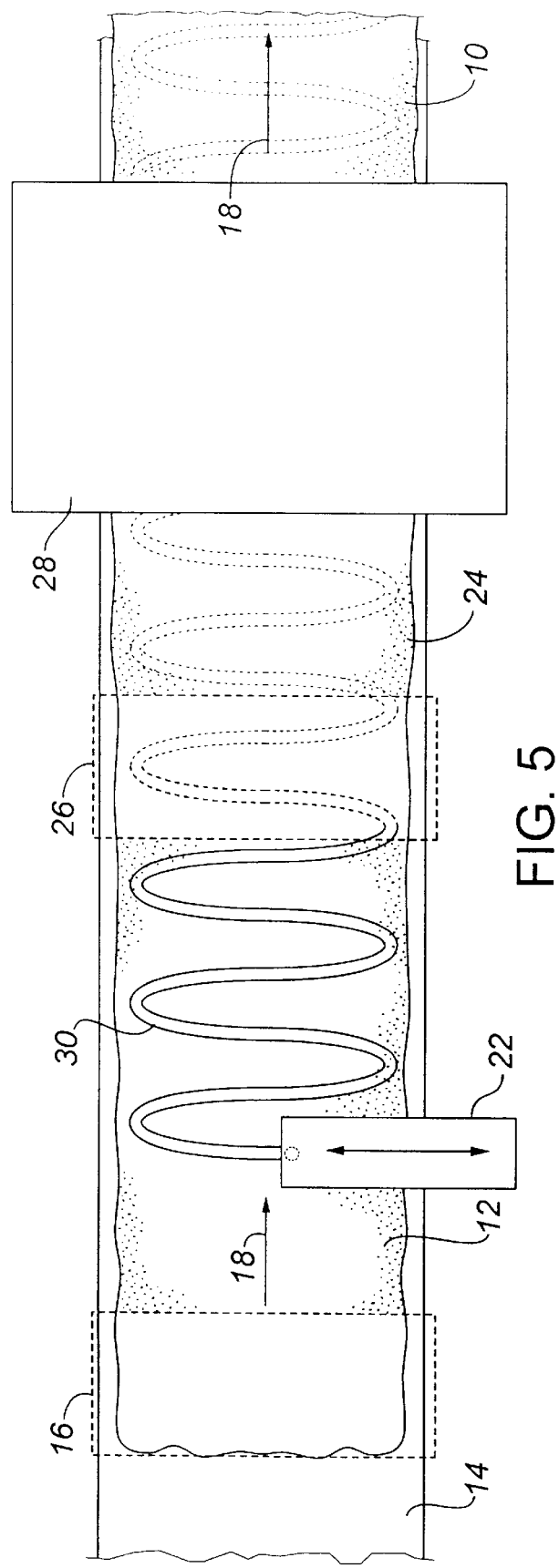
FIG. 5 is a top plan view of a mechanism for forming serpentine reinforcement ribs illustrated in FIG. 2.

The preferred embodiment, a composite panel generally identified by reference numeral 10, and the method of making the same will now be described with reference to FIGS. 1 through 5.

Referring to FIG. 1, the preferred method of making a composite panel includes the following steps. A first step involves laying a first layer 12 of fibres, such as wood particles or straw, mixed with an adhesive binder. In the illustrated embodiment first layer 12 is placed onto a moving conveyor 14 by means of one or more formers 16. The conveyer is moving in the direction indicated by the arrow 18. A second step involves laying onto first layer 12 reinforcement ribs 20 of fibres mixed with an adhesive binder. This is accomplished by means of one or more rib formers 22. Referring to FIG. 2, the reinforcement ribs 20 may be parallel and linear in shape and may be either collinear or transverse with respect to the length of the panel. The structural strength properties of the panel will be determined by the reinforcement rib placement pattern, spacing and density. Referring to FIG. 5, the reinforcement ribs may alternatively be made serpentine 30. More complex patterns may be achieved by means of a microprocessor controlled forming mechanism that can traverse the production line perpendicular and parallel to the line direction. It will be obvious to one skilled in the art that the selection of the shape and spacing of the ribs will be made based on the requirements imposed by the intended use of the panel. Referring to FIG. 3, parallel linear reinforcement ribs 16 can be formed using, for example, a paddle wheel 32. Fibres 34 are fed to paddle wheel 32 by, for example, a second conveyor 36. The spacing of the reinforcement ribs is determined by the speed of rotation of paddle wheel 32 relative to the speed of conveyer 14. The dimensions of the reinforcement ribs 20 are determined by the speed of second conveyor belt 36 relative to the speed of rotation of paddle wheel 32. It is possible to form a usable panel using just first layer 12 and reinforcement ribs 20. It is preferred, however, that a third step be taken of laying onto first layer 12, a second layer 24 of fibres mixed with an adhesive binder by means of one or more formers 26. A fourth step involves using a press 28 to press first layer 12 and second layer 24.

Referring to FIG. 4, a composite panel fabricated in accordance with the teachings of the above described method, is generally identified by reference numeral 40. Panel 40 has planar opposed faces 42 and 44. Imbedded within panel 40 are reinforcement ribs 20.

In initial tests, it was determined that adding reinforcement ribs 20 increased machine stiffness ratings in both perpendicular and parallel directions. At the present time fines are screened out of the material produced, as the panels are being produced by solid long strands. These fines, representing as much as 30% of material, are viewed as waste material and are disposed of. Where four or more layers are utilized, it is anticipated that all interior layers positioned between the ribs can be made from these waste materials. In contrast, surface layers and reinforcement ribs 20 will be made from higher quality materials with longer strand lengths. Long strand materials are preferred for all surface areas to provide more lengthwise strength to supplement the lateral strength provided by the reinforcement ribs. Reinforcement ribs 20 can be placed in any layer and in any orientation. It is anticipated that the spacing and density of the reinforcement ribs 20 can be selected to suit strength requirements. Similarly, it is anticipated that reinforcement ribs 20 can be placed in the direction of the desired strength increase. This enables the panels to be engineered to suit specific applications.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A method of continuously making a composite panel comprising the steps of:
   firstly, laying at least one layer of fibres mixed with an adhesive binder in a continuous manner along a longitudinal axis;
   secondly, laying onto the at least one layer of fibres, reinforcement fibres mixed with an adhesive binder, wherein the reinforcement fibres are laid substantially traverse to the longitudinal axis in spaced apart relationship; and
   thirdly, pressing the at least one layer of fibres and the reinforcement fibres to form a panel with upper and lower planar surfaces and reinforcement ribs in the form of areas of increased fiber density imbedded in the panel.

2. The method as defined in claim 1, having a first layer and a second layer with the reinforcement fibres sandwiched in between.

* * * * *